Jan. 12, 1954  J. C. OGLE, JR  2,665,659
APPARATUS FOR COATING BY THERMAL VAPORIZATION
Original Filed April 2, 1949  3 Sheets-Sheet 1

INVENTOR.
James C. Ogle, Jr.
BY Nobbe & Swope
ATTORNEYS

Jan. 12, 1954    J. C. OGLE, JR    2,665,659
APPARATUS FOR COATING BY THERMAL VAPORIZATION
Original Filed April 2, 1949    3 Sheets-Sheet 2

INVENTOR.
James C. Ogle, Jr.
BY Nobbe & Swope
ATTORNEYS

Jan. 12, 1954 — J. C. OGLE, JR — 2,665,659
APPARATUS FOR COATING BY THERMAL VAPORIZATION
Original Filed April 2, 1949 — 3 Sheets-Sheet 3

INVENTOR.
James C. Ogle, Jr.
BY Nobbe & Swope
ATTORNEYS

Patented Jan. 12, 1954

2,665,659

UNITED STATES PATENT OFFICE 2,665,659

APPARATUS FOR COATING BY THERMAL VAPORIZATION

James C. Ogle, Jr., Tarentum, Pa., assignor to Libbey-Owens-Ford Glass Company, Toledo, Ohio, a corporation of Ohio Continuation of application Serial No. 85,124, April 2, 1949. This application April 24, 1952, Serial No. 284,160

10 Claims. (Cl. 118—49)

The present invention relates to apparatus for supporting, transporting and coating articles by thermal evaporation. It has to do particularly, although not exclusively, with an improved apparatus and with means such as a rack, for supporting a plurality of articles, such as prisms, or the like, in stacked relationship and for maintaining the articles in said stacked relationship upon the apparatus, for example, a movable truck, platform, or dolly, for transporting a plurality of independently supported racks carrying stacked articles from a location where, for example, the faces or surfaces of the articles have been thoroughly cleansed, to another location for storage purposes, or to a thermal evaporating unit or apparatus for positioning within said apparatus.

This application is a continuation of application Serial No. 85,124, filed April 2, 1949, and now abandoned.

The improved rack and mobile platform or dolly of the present invention are particularly useful in connection with apparatus or methods which involve the application of reflective or low reflection surface coatings to articles such, for example, as prisms, wherein it is desirable, and in fact necessary, to thoroughly cleanse the surfaces of the articles and to maintain the cleansed surfaces in such condition either directly or by the application of a provisional or temporary surface protective coating thereto prior to the application of the final or reflective surface coating to said surfaces. Thus, it is desirable to eliminate any manual handling of the articles per se after the articles have been placed in the racks and prior to the deposition of the final reflective, or low reflection, or other type coating onto the surfaces of the articles. Obviously, if the articles were individually and manually handled, the surfaces thereof would be likely to immediately become contaminated, rendering them sufficiently unclean or unfit to receive the deposit of the final coating resulting from the thermal evaporation of a material, and its deposition upon the articles.

It is, therefore, one of the objects of the present invention to provide novel means, and an improved apparatus, for supporting a plurality of articles in racks and for transporting a plurality of groups of such articles, without the necessity of manually handling and thus contaminating, the surfaces of the articles during their transportation from, for example, the cleansing station, or from the time they are placed in the racks, to another station or location where the coating is applied to the surfaces of the articles.

Another object of the present invention is to provide an improved rack for supporting a plurality of articles such, for example, as prisms, in stacked relationship and to maintain the articles in such relationship during transportation and during the application to a surface or surfaces of the articles, of a desired surface coating; it being a further object of the invention to provide an improved rack having means with which certain portions of the articles to be supported may be engaged to be held in their predetermined stacked relationship without shifting in the rack.

A further object of the present invention is to provide an improved rack of the foregoing character having means permitting the rack to be applied to the movable platform or dolly and held in fixed relationship to and in upright position upon the dolly, said means cooperating with improved means forming a part of the movable platform or dolly so as to permit the ready mounting of the rack with its stacked articles upon the platform and also its ready removal therefrom.

A further object of the present invention is to provide an improved rack having adjustable stop means with which one end of the stack of articles contacts so that the rack is capable of being used for supporting articles of different sizes in stacked relationship and holding them against shifting movement when the rack is moved or transported from one location to another location; it being another object of the invention to provide a removable and adjustable spacer member which may be interposed between groups of the stacked articles carried by the rack and which provides means for maintaining the groups of articles in stacked relationship and against accidental shifting movement relative to the rack, and which permits the rack to be used with articles of different sizes and shapes.

Another object of my invention is to provide an improved mobile platform or dolly structure for supporting and transporting a plurality of article-supporting racks in accordance with the present invention, in which the dolly or mobile platform and the racks have improved cooperable means for maintaining the racks in fixed upright positions and in releasably locked condition upon said mobile platform.

A further object of my invention is to provide an apparatus including a vacuum chamber with improved means for releasably supporting the improved racks of the present invention upon the base of the vacuum chamber and in predetermined spaced relationship, so as to present the articles carried by the racks to suitable units or equipment for depositing, preferably by thermal evaporation, metal or other coating materials upon the surfaces of the articles, said supporting means being capable of maintaining the racks and their supported articles in stationary but removable condition; or of revolving or rotating the racks at predetermined speeds during the operation of deposition.

A still further object of the invention is to provide improved means within a vacuum chamber for releasably or removably supporting a plurality of portable article-carrying racks within said chamber.

The foregoing and other objects and advantages of the invention will appear from the following description and appended claims when considered in connection with the accompanying drawings forming a part of this specification wherein like reference characters designate corresponding parts in the several views.

Figure 1:
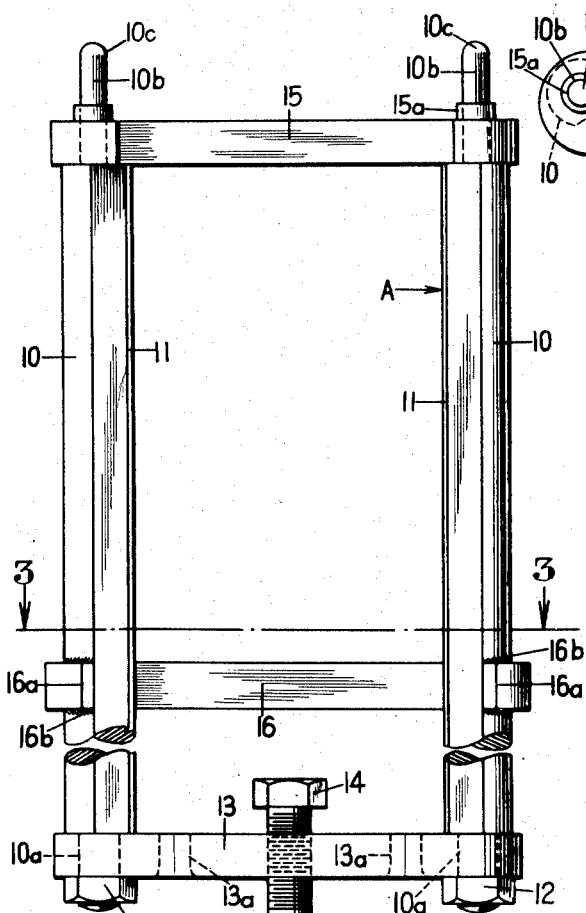
Fig. 1 is a side elevational view, parts being broken to save space, of a preferred form of article-supporting rack or frame embodying the present invention.

Before explaining in detail the present invention, it is to be understood that the invention is not limited in its application to the details of construction and arrangement of parts illustrated in the accompanying drawings, since the invention is capable of other embodiments and of being practiced or carried out in various ways. It is to be understood also that the phraseology or terminology employed herein is for the purpose of description and not of limitation, and it is not intended to limit the invention herein claimed beyond the requirements of the prior art.

Referring now particularly to Figs. 1 to 5, inclusive, of the drawings, there is shown in these figures one preferred form of article-supporting rack or frame structure embodying the present invention. As shown, the improved rack structure A comprises a pair of spaced longitudinally extending substantially parallel rods or members 10 each of which has a longitudinally extending substantially V-shaped slot, groove, or notches 11 formed therein. The lower ends, with reference to Fig. 1, of the rods 10 are reduced at 10a and the outer end portions thereof are threaded to receive nuts 12. The upper ends of the rods 10 are likewise of reduced diameter and terminate in pins or projecting portions 10b having rounded or dome-like outer ends or tips 10c.

The lower ends of the rods are maintained in their spaced and substantially parallel relationship by means of a transverse frame member 13 having holes or openings through which the reduced end portions 10a of the rods extend, the transverse member being fixed to the rods by the nuts 12, above-mentioned. The member 13, as shown, is provided with preferably round holes or sockets 13a whose lower or outer ends are enlarged or flared outwardly, as clearly seen in Fig. 1. The transverse frame member or brace 13 carries an adjustable cap screw or bolt 14 which is threadedly engaged in a threaded opening formed intermediate the ends of the member. The screw or bolt 14 provides an adjustable stop for the column or stack of articles P to be supported by the rack or frame, see Fig. 4.

The opposite or upper ends of the rods 10, with reference to Fig. 1, are similarly maintained in predetermined spaced substantially parallel condition by means of a removable transverse frame member 15 whose outer end portions are provided with openings and carry upstanding hollow bosses 15a so that the member 15 may be slipped over the reduced end portions 10b of the rods. It will be seen that the main or thickened body portions of the rods 10 provide shoulders which serve as stops for the member 15 at one end of the rods and similar stops adjacent their opposite ends for the transverse member 13.

Intermediate the transverse members 13 and 15, the rods 10 are provided with a fixed or permanently attached brace member, shown as a whole at 16, which member has hook-like or reversely curved inwardly directed end portions 16a which are secured, as by welding at 16b, to the rods 10. Normally, the member 13 remains in its position as shown in the drawings and provides, with the brace 16, means for maintaining the parts of the portable rack or frame structure in fixed positions, with or without the upper transverse member 15 which is removable.

Figure 2:
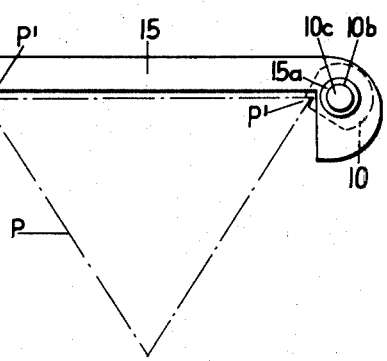
Fig. 2 is a top plan view of the structure shown in Fig. 1 and indicating in broken lines one type of article in supported condition in the rack.
Figure 4:
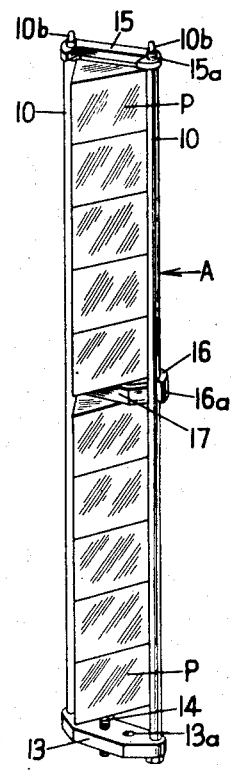
Fig. 4 is a perspective view of the rack shown in the preceding figures supporting a plurality of articles arranged in stacked relationship therein.
Figure 3:
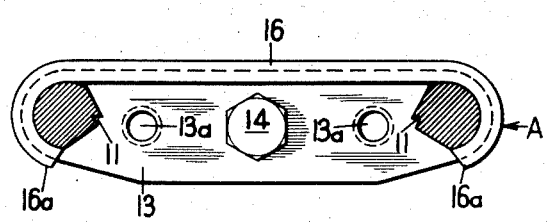
Fig. 3 is a horizontal sectional view taken substantially along the line 3—3 of Fig. 1, looking in the direction of the arrows.
Figure 5:
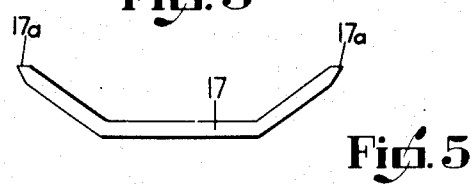
Fig. 5 is a top plan view of a spacer member or device forming a part of the rack structure of the preceding views.

When it is desired to support a plurality of stacked articles, such as the prisms P of Figs. 2 and 4, in the rack, the angular edges or corners P¹ of the prism, see Fig. 2, are brought into registry with the upper end portions of the grooves or slots 11 and the prism moved downwardly in the rack or frame until it contacts the head of the adjustable stop member 14. Any number of additional articles may be assembled in stacked relationship in the rack by repeating this operation. If the overall height or thickness of the articles, when in stacked relationship does not correspond to the distance or space between the transverse member 13 and 15, the stop member 14 may be adjusted to fill in or take up the surplus or excess space. Moreover, if the stop member 14 alone will not accomplish the purpose of causing the stacked articles to remain in position against undesirable shifting movement lengthwise of the rack, a removable spacer, such as that shown as a whole at 17, may be employed. This spacer 17, as shown, is of generally V-shape in longitudinal cross section and has, as shown, pointed or wedge-shaped free end portions 17a which are preferably shaped so as to interfit with the longitudinal grooves or notches 11 formed in the rods 10 with sufficient freedom to permit the spacer to be moved in the grooves longitudinally of the rack or frame structure. As seen in Fig. 4, merely by way of example, the stack of articles P is separated into two groups of five articles each, the removable spacer member 17 being interposed between and filling the space between the two groups. The lower article of the lower group rests upon the head of the stop member 14 and the upper member of the top group of articles terminates substantially at the outer or upper end of the slots 11. As shown in the drawings, the removable upper transverse frame member 15 is so shaped and proportioned as to permit the articles P and/or the spacer 17 to be engaged with the slots 11 and moved to the desired positions in the rack, without necessitating the removal of the member 15 from the remaining rack structure.

Referring now particularly to Figs. 6 to 9, inclusive, of the drawings, there is shown in these figures an improved mobile platform, truck or dolly B, embodying the present invention and having, merely by way of example, four of the article-supporting racks of the present invention shown in position carrying supported articles in stacked relation, releasably locked and maintained in upright positions thereupon.

Merely by way of example, the mobile platform, truck or dolly B of the present invention comprises a suitable braced frame structure shown as a whole at 20 and carrying a substantially horizontal floor or base 21. The frame 20 is provided at its corners with casters or rollers 22 to permit the truck or dolly to be moved easily over a floor or other supporting surface. The portable or movable platform or dolly is provided with a handle 23 mounted at one end of the table 21 by means of upright frame members or bars 24.

Figures 6, 7:
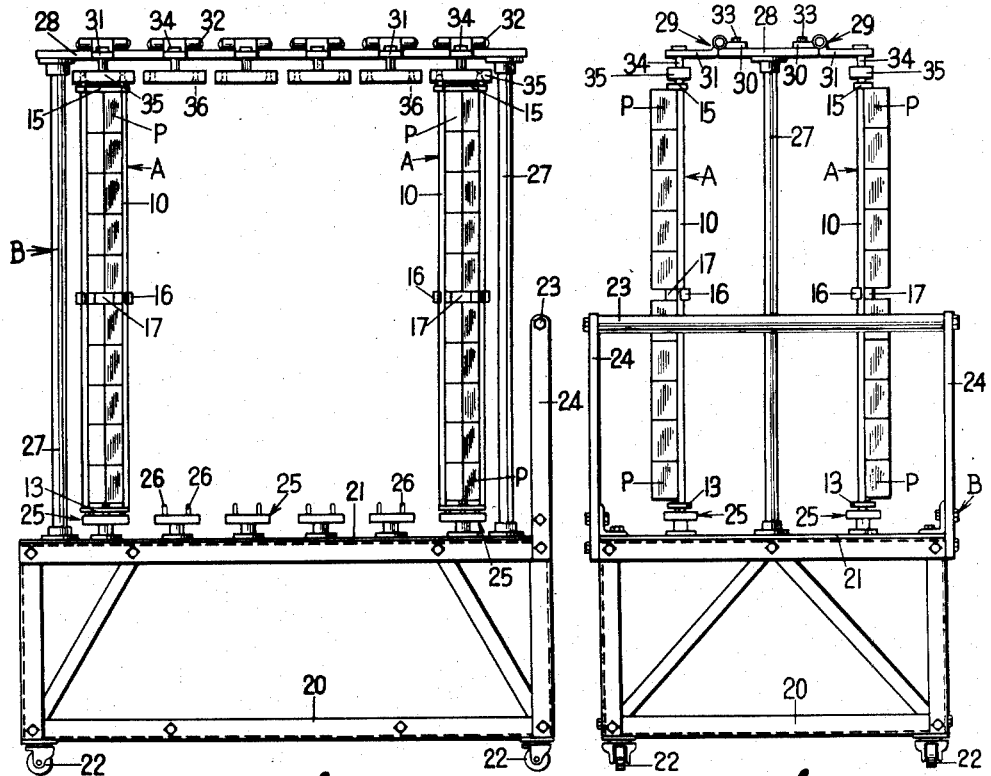
Fig. 6 is a side elevational view of an improved mobile platform or dolly embodying the present invention, shown supporting several of the racks carrying stacked articles in accordance with the present invention.
Fig. 7 is an end elevational view of the structure shown in Fig. 6 and taken in a direction looking toward the right side of the structure of Fig. 6.

The table or horizontal supporting surface 21 of the dolly is provided, as shown merely by way of illustration, with a plurality of rack supporting members or elevated bases, each of which is shown as a whole at 25. These members 25, as shown, are mounted in fixed and spaced relationship upon the table top surface 21. Each support or base member has, as shown, a pair of spaced upstanding or projecting pins or studs 26, for a purpose to be described below. As seen in Figs. 6 and 7, the base members 25 are arranged in rows extending lengthwise of the dolly floor 21, there being shown, merely by way of example, six such supporting base members in each row, see Fig. 6.

The base members 25 just described provide means for supporting the lower end portions of a like number of the racks A shown in Figs. 1 to 5, inclusive. It is desirable to support also the upper end portions of these racks. For this purpose, a pair of upright standards 27 is provided. One of these standards 27 is mounted adjacent one end of the floor or base 21 and the other standard is similarly mounted adjacent the opposite end of said floor, the two members being, as shown, disposed at substantially the longitudinal center of the floor.

Figures 8, 9:
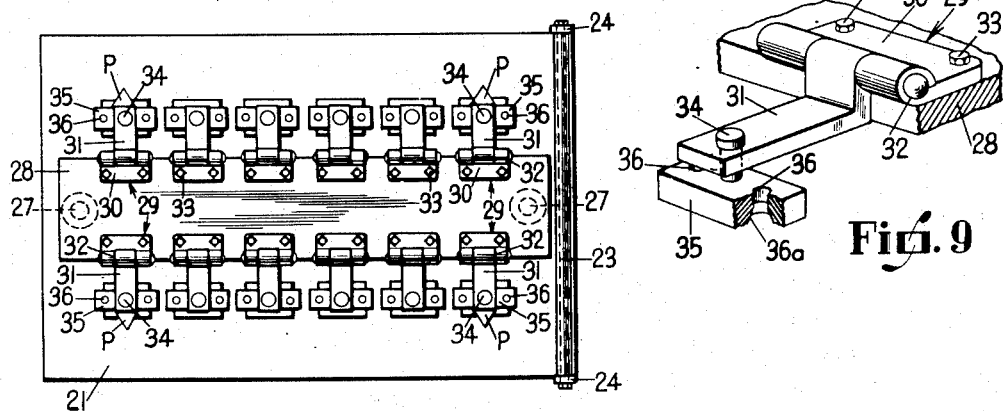
Fig. 8 is a top plan view of the structure shown in Figs. 6 and 7.
Fig. 9 is a fragmentary detail perspective view, partly in section and partly broken away, of one preferred form of means for supporting and releasably holding or locking the upper end portion of an article-supporting rack of the invention upon the improved dolly.

The standards 27 support at their upper ends a longitudinal horizontally disposed plate or member 28 which extends substantially the length of the platform floor or base 21, see Fig. 8. The oblong plate or member 28 provides means for supporting along its side edges, a plurality of movable or swingable members which are adapted to engage and cooperate with the upper ends of a similar number of article-supporting racks A to serve, with the cooperating and supporting base members 25, to maintain said racks in predetermined spaced and upright positions upon the dolly. The movable means, as shown, comprise hinge-like members, each of which is shown as a whole at 29. Each of these members has a fixed base or portion 30 and an outwardly projecting movable strap-like portion or member 31, the strap-like member 31 being hinged or pivotally connected at 32 to the fixed member or portion 30 which latter, as shown in Fig. 9, is preferably bolted at 33 to the supporting plate 28. The outer end of each strap-like member 31 is provided with a depending pin or projecting member 34, which carries at its lower end a rectangular socket plate or member 35 having longitudinally spaced holes or openings 36 whose lower portions are enlarged or flared outwardly at 36a. These openings 36, 36a, provide sockets or pockets to receive the reduced end portions 10b, 10c, of the rack rods or members 10 to hold the racks A in releasably locked position upon the dolly.

It will be understood that when it is desired to position one of the racks A with its stacked articles P therein upon the movable platform or dolly B, the rack is placed bodily upon the dolly so that the sockets or openings 13a formed in the member 13 will be brought into registry with and telescope over the upwardly projecting pins 26 of one of the supporting blocks or members 25. The cooperating hinged member 31 is then swung about its pintle or pivot 32 to bring the openings or sockets 36, 36a into registry with the pins 10b, 10c of the rack and to telescope thereover. Thus, the rack with its supported articles, is releasably mounted in position upon the mobile truck or dolly and is in readiness to be moved or transported by said dolly. When it is desirable to remove a rack from the dolly, it is merely necessary to swing the strap-like supporting member 31 about its pivot 32 to release the rack pins 10b, 10c, whereupon the rack, as a unit, may be lifted off its supporting base 25 and bodily removed from the dolly.

Figure 10:
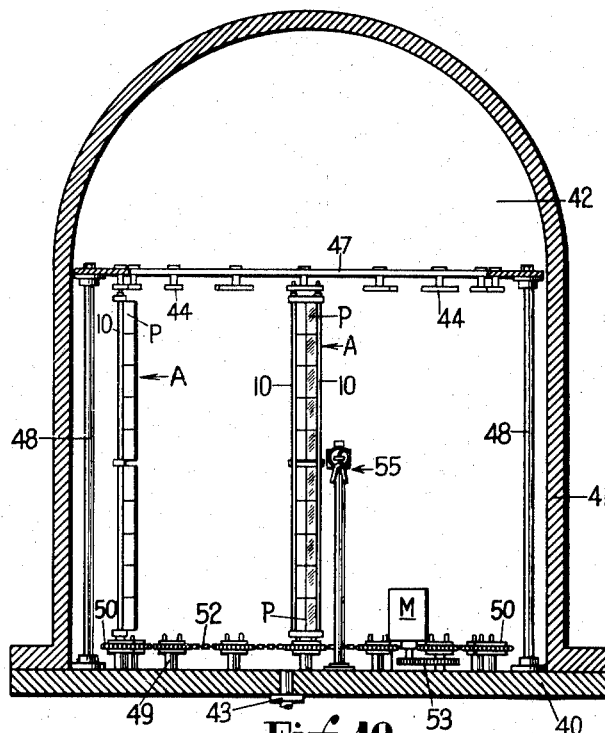
Fig. 10 is a vertical sectional view, partly in elevation, of a thermal depositing apparatus or chamber having therein improved rack-supporting means embodying the present invention.
Figure 11:
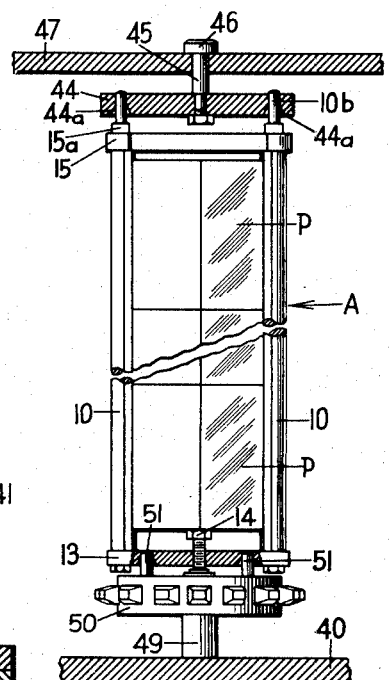
Fig. 11 is a fragmentary detail elevational view, partly in section, on an enlarged scale and broken away, of the rack-supporting means and one of the article-carrying racks of Fig. 10.

Referring now to Figs. 10 to 13, inclusive, of the drawings, there is shown in these figures two forms of improved means for removably or releasably supporting the article-carrying and supporting racks or frames of the present invention in position within a vacuum chamber in which thermal evaporation and deposition operations may be performed. In Figs. 10 and 11, suitable means is provided for supporting the article-carrying racks in spaced relation within the chamber and permitting the racks to be rotated or revolved, simultaneously, while the thermal evaporating and deposition operation is being performed, or intermittently to a desired angular degree to cause different faces to be presented where these are to be coated with various different substances.

The apparatus of Figs. 10 and 11 comprises, as shown, base 40 upon which a dome-like casing, housing or bell 41 is supported or fitted to close the chamber, thus providing a chamber 42 within which thermal evaporation operations may be carried out. A pipe or conduit 43 is in communication with the interior of the chamber and with high speed suction pumps (not shown) for withdrawing air from the chamber to create a vacuum therein.

The article-supporting racks A carrying articles P, such racks being shown in detail in the preceding views of the drawings, are arranged in spaced relationship adjacent the upright walls of the chamber, along the periphery of a circle, two such racks being shown in Fig. 10. These individual racks A are supported at their upper ends by means of vertically movable latch or socketed members 44. Each of these members is carried by a depending pin 45 having an enlarged head 46, the pin extending through a hole or opening formed in an annular or ring-like member 47. This ring-like or circular member is supported, as shown, upon and parallel to the base 40 and spaced therefrom by means of a plurality of upright supports or rods 48. Each of the members 44 is provided with a pair of spaced sockets 44a, similar to those shown at 36, 36a, in Fig. 9 of the drawings and the sockets are adapted to receive and support the pins or projecting portions 10b at the upper ends of the rods 10 of the rack A.

The lower end portion 13 of each of the racks is provided with spaced openings or sockets 13a, similar to those shown in Fig. 1 of the drawings. The base member 40 of the chamber is provided with a plurality of vertically disposed relatively short supporting posts 49, each of these posts having rotatably mounted thereupon, a sprocket or peripherally toothed member 50. The upper surface of each of the sprockets 50 carries a pair of upright or vertically disposed pins or studs 51 which are adapted to engage in the sockets 13a of the article-carrying frame or rack and support the bottom portion of the rack in predetermined position upon the sprocket. A sprocket chain 52 (Fig. 10) is in engagement with each of the sprockets 50 and is connected, by virtue of suitable gearing, shown as a whole at 53, with a prime mover including a preferably brushless type electric motor M mounted upon the base 40. Thus, by operating the electric motor, it will be understood that the sprocket chain is driven to revolve or rotate, simultaneously, all of the sprockets 50 which, in turn, will cause the article-carrying racks A, which are supported by the sprockets, to be likewise turned or revolved, simultaneously. The driving means for the sprockets 50 may be generally similar to that disclosed in the co-pending application of Colbert and Weinrich, Serial No. 531,690, now Patent 2,414,406, dated January 14, 1947. Or, one of these sprockets, through its axle 49 may be connected to a prime mover outside the chamber when axle 49 is extended through the chamber wall.

The racks A with their supported articles, may be removed from the dolly shown in Figs. 6 to 9, inclusive, of the drawings and the pins 10b thereof brought into engagement with the vertically movable and freely rotatable latch or socketed members 44 carried by the supporting ring 47. The sockets 13a at the bottom end of the rack A are then brought into registry with the sprocket-carried supporting pins or studs 51 and the rack or frame lowered into the position in which it is shown in Fig. 11. After the racks have been placed in their predetermined upright positions, the housing 41 is lowered into position upon the base 40, the chamber vacuumized, and the thermal evaporating filament or filaments 55 located within the circle formed by the racks and attached to the base 40 which carry the materials to be evaporated are energized to start the thermal evaporating action and to effect the deposition of the desired material upon the surfaces or faces of the articles supported by the racks A. The electric motor is operated and serves to revolve the racks A and their supported articles P during the thermal evaporating and depositing operation, or may be used between the application of successive coatings to different faces by causing sufficient rotation of the racks and articles to present the uncoated faces successively towards the evaporation filaments.

Figure 12:
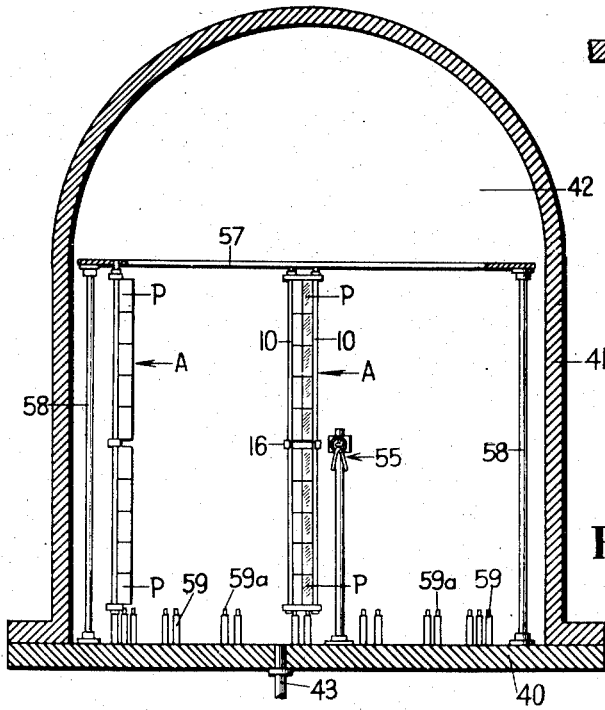
Fig. 12 is a view similar to Fig. 10 and showing a modified form of means for releasably supporting the article-carrying racks embodying the present invention.
Figure 13:
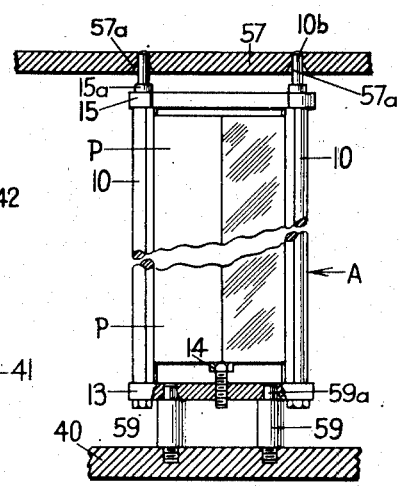
Fig. 13 is a view similar to Fig. 11, being a detail, on an enlarged scale and broken away, of one of the racks and rack-supporting means of Fig. 12.

In Figs. 12 and 13 of the drawings we have shown a somewhat modified form of means for supporting a plurality of the article-carrying racks or portable frames A within the vacuum chamber 42. In this form of the invention the upper end portions of the racks are supported by means of an annular or ring-like member 57 which is supported above the base 40 in spaced relation thereto, by upright supporting members or rods 58 in substantially the same manner as shown in Fig. 10. In the present form of the invention, the ring-like member 57 is provided at predetermined spaced points with pairs of holes or sockets 57a to receive the pins or projecting portions 10b of the article-carrying rack or frame A. The base 40 of the apparatus, in the present form of the invention, is provided with spaced pairs of upright supporting posts or members 59, each of which has a reduced pin-like upwardly projecting end portion 59a. The pins 59a are adapted to be received in the openings or sockets 13a formed in the bottom member 13 of the rack A, as clearly seen in Fig. 13. The pairs of members 59 are positioned in vertical alignment and registry with and below the pairs of openings or sockets 57a formed in the upper supporting ring 57, so as to support the racks A in predetermined spaced and preferably vertical positions within the vacuum chamber 42, as seen in Fig. 12 whereby the face of the article to be coated is presented towards the evaporation filaments 55.

The racks A are preferably removed from the dolly or portable cart of Figs. 6 to 9, inclusive, of the drawings, and the pair of pins 10b of each rack moved into engagement with the sockets 57a of the upper ring member. The pins 10b are of sufficient length to permit the rack to be moved upwardly toward the supporting ring 57 so that the sockets 13a in the base of the article-carrying rack or frame may be brought into engagement with the pins or studs 59a and the rack lowered into position, as clearly seen in Fig. 13. After the desired number of racks A has been placed upon the base 40 and held thereupon in the manner above-described, the bell-like casing or housing 41 is lowered into position upon the base 40 and the chamber 42 is then exhausted of its air content to create a vacuum therein, whereupon the thermal evaporating unit or equipment 55 is operated to effect the deposition, by thermal evaporation, of the desired material upon the surface or surfaces of the rack-supported articles P. The form of rack supporting means shown in Figs. 12 and 13 is adapted particularly for use in connection with applying coatings to only certain faces or surfaces of articles located within the vacuum chamber, the articles in their supporting racks being presented, as desired, to the thermal evaporating equipment, and wherein it is not necessary to revolve or rotate the racks and their supported articles.

By virtue of the present invention, it will be seen that a plurality of the improved racks or article-supporting frames A embodying the invention, may be placed upon the improved mobile truck or dolly B, also embodying the invention, and held in upright positions and in spaced relatinoship thereupon to be transported, by the truck or dolly, from one location to another location, and may then be removed from the dolly, without any manual handling whatsoever of the individual supported articles. Moreover, the racks A may be removed from the dolly and placed directly in suitable apparatus for applying, preferably by deposition resulting from thermal evaporation, a coating or coatings to a surface or plurality of surfaces of the articles. For example, the individual racks may be placed within the apparatus shown in Figs. 10 and 12 to be supported in predetermined spaced relationship therein by the improved rotatable releasable rack supporting means shown in these figures.

I claim:

1. In combination with a vacuum chamber having a supporting surface and a housing fitting upon said surface, said chamber including thermal evaporating means, of means located within the chamber and carried by the supporting surface thereof for removably supporting a plurality of article-carrying portable racks in predetermined spaced relationship within the chamber, said rack supporting means comprising rotatable socketed support means for releasably receiving and supporting one end portion of said portable racks, said rack supporting means also including rotatively mounted support means engageable with the other end portion of the portable racks for supporting the same for rotative movement within the chamber, said rotatively mounted support means being positioned in alignment respectively with the rotatable socketed support means, and means associated with said rotatively mounted support means for causing rotative movement thereof.

2. In combination with a vacuum chamber having a supporting surface and a housing fitting upon said surface, said chamber including thermal evaporating means, of means supported within the chamber for removably supporting a plurality of article-carrying portable racks in predetermined spaced relationship within the chamber, said rack supporting means including a supporting member having rotatable socketed support means for releasably receiving and supporting one end portion of said portable racks, said rack supporting means also including rotatively mounted support means engageable with the other end portion of the portable racks for supporting the same for rotative movement within the chamber, said rotatively mounted support means being positioned in alignment respectively with the rotatable socketed support means, and means associated with said rotatively mounted support means for causing rotative movement thereof.

3. In combination with a vacuum chamber having a supporting base and a housing in contact with said base, said chamber including thermal evaporating means, of means located within the chamber and supported by said base thereof for removably supporting a plurality of article-carrying portable racks in predetermined spaced relationship within the chamber, said rack supporting means comprising a supporting member having rotatable socketed support means for releasably receiving and supporting one end portion of said portable racks, said rack supporting means also including rotatively mounted support means engageable with the other end portion of the portable racks for supporting the same for rotative movement within the chamber, said rotatively mounted support means being positioned in alignment respectively with the rotatable socketed means, and means associated with said rotatively mounted support means for causing rotative movement thereof.

4. In combination with a vacuum chamber having a base and a housing fitting upon said base, said chamber including thermal evaporating means, of means located within the chamber and supported by the base thereof for removably supporting a plurality of article-carrying portable racks in predetermined spaced relationship within the chamber, said rack supporting means comprising a supporting member having rotatable socketed support means for releasably receiving and supporting one end portion of said portable racks, said rack supporting means also including rotatively mounted support means engageable with the other end portion of the portable racks for supporting the same for rotative movement within the chamber, said rotatively mounted support means being positioned in alignment respectively with the rotatable socketed support means, and means associated with said rotatively mounted support means for causing rotative movement thereof.

5. In combination with a vacuum chamber having a base and a housing fitting upon said base, said chamber including thermal evaporating means, of means located within the chamber and supported by the base thereof for removably supporting a plurality of article-carrying portable racks in predetermined spaced relationship within the chamber, said rack supporting means comprising a ring-like member supported parallel to the base and in spaced relationship thereto, rotatable members carried by said ring-like member arranged along the periphery of a circle for releasably engaging and supporting one end portion of the racks, said rack supporting means also including rotatable members located upon and positioned adjacent to the base along the periphery of a circle in alignment respectively with the rotatable members carried by said ring-like member parallel to the base for releasably engaging and supporting the other end portion of the racks, a sprocket carried by each of said last-named rotatable members, a sprocket chain engaging all of such sprockets for imparting rotative movement to all of said members and their supported article-carrying racks simultaneously, and a motor connected to said chain for effecting rotation of the portable racks.

6. In combination with a vacuum chamber having a base and a removable housing mounted upon said base, said chamber including thermal evaporating means, of means located within the chamber and supported by the base thereof for removably supporting a plurality of article-carrying portable racks in predetermined spaced relationship within the chamber, said rack supporting means comprising a supporting member mounted above the base and in spaced relationship thereto having rotatable socketed support means for releasably receiving and supporting one end portion of said portable racks, said rack supporting means also including rotatively mounted support means for releasably engaging the other end portion of the portable racks for supporting the same for rotative movement within the chamber, said rotatively mounted support means being positioned in alignment with the rotatable socketed support means carried by said supporting member above the base, and means associated with said rotatively mounted support means for causing rotative movement thereof.

7. In combination with a vacuum chamber having a base and a removable housing mounted upon said base, said chamber including thermal evaporating means, of means located within the chamber and supported by the base thereof for removably supporting a plurality of article-carrying portable racks in predetermined spaced relationship within the chamber, said rack supporting means comprising a ring-like member supported above the base and in spaced relationship thereto, rotatable members carried by said ring-like member arranged along the periphery of a circle for releasably engaging and supporting the upper end portions of the racks, said rack supporting means also including rotatable members located upon and positioned adjacent to the base along the periphery of a circle in alignment respectively with the rotatable members carried by said ring-like member above the base for releasably engaging and supporting the lower end portions of the racks, a sprocket carried by each of said rotatable members positioned adjacent the base, a continuous ring-like sprocket chain engaging all of such sprockets for imparting rotative movement to all of said members and their supported article-carrying racks simultaneously, and a motor connected to said chain for effecting rotation of the portable racks.

8. In combination with a vacuum chamber having a base and a housing fitting upon said base, said chamber including thermal evaporating means, of means located within the chamber and supported by the base thereof for removably supporting a plurality of article-carrying portable racks in predetermined spaced relationship within the chamber, said rack supporting means comprising a supporting member mounted parallel to the base and in spaced relationship thereto, rotatable members carried by said supporting member and having sockets for releasably receiving portions of one end of the racks for supporting the same, said rack supporting means also including a plurality of posts carried upon said base, a member rotatably mounted upon each post, and studs carried by each of said last-named members and engageable with the other end of the racks for supporting the same, said last-named members aslo being positioned in alignment respectively with the rotatable members carried by said supporting member parallel to the base, and means associated with said last-named members for causing rotative movement thereof.

9. In combination with a vacuum chamber having a base and a housing fitting upon said base, said chamber including thermal evaporating means of means located within the chamber and supported by the base thereof for removably supporting a plurality of article-carrying portable racks in predetermined spaced relationship within the chamber, said rack supporting means comprising a ring-like member mounted parallel to the base and in spaced relationship thereto, rotatable members carried by said ring-like member arranged along the periphery of a circle and having sockets for releasably receiving portions of one end of the racks for supporting the same, said rack supporting means also including a plurality of posts carried upon said base, a sprocket member rotatably mounted upon each post in alignment respectively with the rotatable members carried by said ring-like member parallel to the base, studs carried by each sprocket member for releasably engaging the other end of the racks for supporting the same, a sprocket chain engaging all of such sprocket members for imparting rotative movement to all of said members and their supported article-carrying racks simultaneously, and a motor connected to said chain for effecting rotation of the portable racks.

10. In combination with a vacuum chamber having a base and a removable housing mounted upon said base, said chamber including thermal evaporating means, of means located within the chamber and supported by the base thereof for removably supporting a plurality of article-carrying portable racks in predetermined spaced relationship within the chamber, said rack supporting means comprising a ring-like member supported above the base and in spaced relationship thereto, rotatable members carried by said ring-like member for free movement with respect thereto and having sockets for releasably receiving portions of the upper ends of the racks for supporting the same, said rotatable members being arranged along the periphery of a circle, said rack supporting means also including a plurality of posts carried upon said base, a horizontal sprocket member rotatably mounted upon each post, said sprocket members being arranged along the periphery of a circle and in alignment respectively with the rotatable members carried by said ring-like member above the base, studs carried by each sprocket member and engageable with the lower ends of the racks for supporting the same, a continuous ring-like sprocket chain engaging all of such sprocket members for imparting rotative movement to all of the article-carrying racks simultaneously, and a motor connected to said chain for effecting rotation of the portable racks.

JAMES C. OGLE, Jr.

References Cited in the file of this patent

UNITED STATES PATENTS

| Number | Name | Date |
|---|---|---|
| 2,260,471 | McLeod | Oct. 28, 1941 |
| 2,369,764 | Ullrich | Feb. 20, 1945 |
| 2,414,406 | Colbert et al. | Jan. 14, 1947 |
| 2,453,801 | Mattern | Nov. 16, 1948 |
| 2,475,854 | Ogle | July 12, 1949 |
| 2,522,272 | Johnson et al. | Sept. 12, 1950 |